US008434000B2

(12) United States Patent
Cantwell et al.

(10) Patent No.: US 8,434,000 B2
(45) Date of Patent: Apr. 30, 2013

(54) SYSTEM AND METHOD FOR ARCHIVING PORTIONS OF AN OUTPUT OF A WEB APPLICATION

(75) Inventors: Brad A. Cantwell, League City, TX (US); Aaron R. McDowell, Dickinson, TX (US)

(73) Assignee: International Business Machines Corporation, Armonk, NY (US)

( * ) Notice: Subject to any disclaimer, the term of this patent is extended or adjusted under 35 U.S.C. 154(b) by 1377 days.

(21) Appl. No.: 11/968,378

(22) Filed: Jan. 2, 2008

(65) Prior Publication Data

US 2009/0172045 A1 Jul. 2, 2009

(51) Int. Cl.
G06F 17/00 (2006.01)

(52) U.S. Cl.
USPC ............ 715/234; 715/200; 715/255; 715/273

(58) Field of Classification Search .................. 715/255, 715/273, 234
See application file for complete search history.

(56) References Cited

U.S. PATENT DOCUMENTS

| | | | |
|---|---|---|---|
| 6,351,767 B1* | 2/2002 | Batchelder et al. ........... 709/219 |
| 6,622,168 B1* | 9/2003 | Datta ............................ 709/219 |
| 6,810,414 B1* | 10/2004 | Brittain ........................ 709/219 |
| 7,154,616 B2* | 12/2006 | Watanabe et al. ............ 358/1.13 |
| 7,325,188 B1* | 1/2008 | Covington et al. ........... 715/234 |
| 7,509,404 B2* | 3/2009 | Agrawal et al. ............... 709/223 |
| 7,594,001 B1* | 9/2009 | Ebbo et al. .................... 709/219 |
| 7,685,229 B1* | 3/2010 | George et al. ................. 709/203 |
| 7,765,274 B2* | 7/2010 | Kasriel et al. ................. 709/217 |
| 7,802,185 B1* | 9/2010 | Cooper et al. ................. 715/276 |
| 7,827,070 B1* | 11/2010 | Abrams et al. ........................ 1/1 |
| 7,987,454 B2* | 7/2011 | Hennessy ...................... 717/134 |
| 8,112,813 B1* | 2/2012 | Goodwin et al. ............... 726/27 |
| 8,225,197 B1* | 7/2012 | Szewczyk ..................... 715/241 |
| 8,286,076 B1* | 10/2012 | Szewczyk ..................... 715/241 |
| 2002/0004813 A1* | 1/2002 | Agrawal et al. ............... 709/201 |
| 2002/0144269 A1* | 10/2002 | Connelly ........................ 725/49 |
| 2003/0101412 A1* | 5/2003 | Eid ................................ 715/513 |
| 2004/0019611 A1* | 1/2004 | Pearse et al. ............... 707/104.1 |
| 2005/0154679 A1* | 7/2005 | Bielak ............................. 705/59 |

(Continued)

OTHER PUBLICATIONS

"Advanced JavaServer Pages™"; By: David M. Geary; Publisher: Prentice Hall; Pub. Date: May 30, 2001; Print ISBN-13: 978-0-13-030704-0; excerpt retrieved from safaribooksonline.com on Oct. 14, 2011.*

(Continued)

*Primary Examiner* — Doug Hutton, Jr.
*Assistant Examiner* — Benjamin Smith
(74) *Attorney, Agent, or Firm* — John Pivnichny; Roberts Mlotkowski Safran & Cole, P.C.

(57) ABSTRACT

A system and method is provided for archiving only pertinent portions of a web application. In implementation, the system and method of the invention allows web applications to easily save important areas of a web page that are displayed to the user. The important areas may include, for example, confirmation of a transaction or other sales information. The important areas, also referred to as pertinent portions, are saved as a file on a server, database or other computing device for future reference. The method comprises placing a first scripting tag at a first location in an HTTP document and placing a second scripting tag in a second location in the HTTP document. The text between the first scripting tag and the second scripting tag is rendered and saved into a file upon execution of the HTTP document.

17 Claims, 2 Drawing Sheets

U.S. PATENT DOCUMENTS

| | | | | |
|---|---|---|---|---|
| 2005/0262358 | A1* | 11/2005 | Jolley | 713/182 |
| 2005/0268341 | A1* | 12/2005 | Ross | 726/26 |
| 2006/0011716 | A1* | 1/2006 | Perkowski | 235/375 |
| 2006/0069920 | A1* | 3/2006 | Jolley | 713/182 |
| 2006/0282501 | A1* | 12/2006 | Bhogal et al. | 709/203 |
| 2007/0143748 | A1* | 6/2007 | Hennessy | 717/171 |
| 2007/0263240 | A1* | 11/2007 | Hirai | 358/1.11 |
| 2008/0133680 | A1* | 6/2008 | Kodama | 709/206 |
| 2009/0150262 | A1* | 6/2009 | Mizhen | 705/27 |
| 2010/0251143 | A1* | 9/2010 | Thomas et al. | 715/760 |

OTHER PUBLICATIONS

"JSP™ and Tag Libraries for Web Development"; By: Wellington L.S. da Silva; Publisher: Que; Pub. Date: Oct. 22, 2001; Print ISBN-13: 978-0-7357-1095-5; excerpt retrieved from Safari Books Online, safaribooksonline.com, on Oct. 14, 2011.*

ColdFusion MX 7; Macromedia—ColdFusion : ColdFusion MX 7 Documentation; ColdFusion Markup Language (CFML) Reference; http://www.adobe.com/support/documentation/en/coldfusion/mx7/; 2005.*

Mahmoud, Q. H., "Developing Web . . . JavaServer pp. 2.0", http://java.sun.com/developer/technicalArticles/javaserverpages/JSP20/, Sun Microsystems, Inc., Jul. 2003, 10 pages.

"mod_tee", http://apache.webthing.com/mod_tee/, WebThing Ltd., Oct. 29, 2003 (as noted on the attached screen shot of the Wayback Machine), 1 page.

"mod_trace_output Server Monitor: Track the . . . Apache Web server", http://trace-output.sourceforge.net/, SourceForge.net, Nov. 29, 2002 (as noted on the attached screen shot of the Wayback Machine), 8 pages.

* cited by examiner

US 8,434,000 B2

SYSTEM AND METHOD FOR ARCHIVING PORTIONS OF AN OUTPUT OF A WEB APPLICATION

FIELD OF THE INVENTION

The invention generally relates to a system and method for computer systems and, more particularly, to a system and method for archiving pertinent portions of a web application for future retrieval.

BACKGROUND OF THE INVENTION

Web applications are becoming ever more important for worldwide commerce. For example, there are currently countless numbers of web applications that offer goods and services throughout many industries. And, as technology advances, these web applications are becoming even more pervasive throughout the world economy as they are becoming more user-friendly and secure. Currently, applications are defined using Hyper-Text Markup Language ("HTML"). HTML provides a standard set of tags that define how a Web page is to be displayed. When the requested HTML document is received by the client computer system, the browser displays the Web page as defined by the HTML document. The HTML document may also contain URLs of other Web pages available on that server computer system or other server computer systems.

By way of example, it is becoming very easy for a consumer to purchase goods from a vendor, via the Internet. This can be done by logging onto the vendor's home page and simply selecting the desired goods for purchase. Once the transaction is made, the web application typically responds with a confirmation to the consumer, confirming the transaction. The confirmation may include, for example, credit card information, price, purchased goods and delivery information. The confirmation, like the remaining portions of the web application, is in HTML, for example.

The entire response (i.e., URL) is typically saved to a server so that if there is a dispute of the charge, etc., the vendor can access the confirmation information to check on the accuracy of the order. However, HTML files can be very verbose and can place a large load on the server by saving the entire response. This load may, in turn, slow server response or otherwise impair the system. Also, to save the entire response is not a trivial design task, in that a programmer or designer may not always be able to capture the correct information or any information at all, depending on the complexity of the system.

Solutions in the industry have included designing a web server module that saves a copy of any response from the application server before sending to the user. One drawback of this approach is that it will save any response and will save the entire response, i.e., an entire URL. Another approach is to actually submit a second HTTP request to the application server from business logic in a servlet. This approach also increases resource usage. For example, a second request adds to the application server load and is not guaranteed to return the exact response as the response to the user, i.e., an entire URL.

Another solution is to add a Servlet filter to the web application. In this approach, a filter is implemented to write the entire response from the servlet to a file before returning it to the user's browser. This solution could be configured to only save the responses for certain URLs but still has the drawback of having to save the entire response.

Accordingly, there exists a need in the art to overcome the deficiencies and limitations described hereinabove.

SUMMARY OF THE INVENTION

In a first aspect of the invention, a method comprises placing a first scripting tag at a first location in an HTML document and placing a second scripting tag in a second location in the HTML document. The text between the first scripting tag and the second scripting tag is rendered and saved into a file upon execution of the HTML document by virtue of the location and instructions of the first scripting tag and the second scripting.

In another aspect of the invention, a method for archiving pertinent portions of a web application comprises providing a computer infrastructure being operable to: execute a script in an HTTP document; create a temporary buffer; output results of the script to the temporary buffer; and write the results from the temporary buffer to a file and into a response stream.

In another aspect of the invention, a computer program product archives pertinent portions of a web application. The computer program product comprises: a computer readable media; first program instructions to execute a script in an HTTP document; second program instructions to create a temporary buffer; and third program instructions to output results of the script to the temporary buffer and write the results from the temporary buffer to a file and into a response stream. The first, second and third program instructions are stored on the computer readable media.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF EMBODIMENTS OF THE INVENTION

The invention generally relates to a system and method for computer systems and, more particularly, to a system and method for archiving only pertinent portions of a web application. In implementation, the system and method of the invention allows web applications to easily save important areas of a web page that are displayed to the user. The important areas may include, for example, confirmation of a transaction or other sales information. The important areas, also referred to as pertinent portions, are saved as a file on a server, database or other computing device for future reference.

In implementation, the system and method of the present invention utilizes a custom JavaServer Pages (JSP) tag that can be used to mark important areas of a JSP. In embodiments, data between the start tag and an end tag will be saved; whereas, in comparison to current systems, the entire HTML document was saved. In embodiments, the system and method of the invention is not limited to JSP scripting, but can equally be implemented in many other server side scripting technologies like Active Server Pages (ASP) and PHP: Hypertext Preprocessor (PHP). An exemplary snippet of JSP includes:

```
<%@ taglib prefix="util" uri="http://www.ibm.com/tags" %>
[TEXT NOT TO BE SAVED TO A FILE]
<util:save filename="receipt.html">
[TEXT TO BE SAVED TO A FILE]
</util:save>
[TEXT NOT TO BE SAVED TO A FILE]
```

As the designer or programmer can directly add the JSP tags into the HTML document, it is now possible to save only the important areas of the web application to a file while it is being rendered for the user. This allows the service provider or merchant, for example, to save exactly what is being sent to the user, which greatly reduces the size of the saved file. This, in turn, will reduce the load on the computing device, e.g., server, database, etc., which is tasked with saving the information, as only the pertinent information and not an entire HTTP (HTML) document is saved by the present invention. Comparatively to known methodologies, there is no need to use filters or servlet modules, which are designed to save an entire URL. Also, as the tags are written directly into to the document, unlike modules and filters, this is an easy and efficient way to ensure that appropriate text is always captured.

As should be known by those of skill in the art, JSP is a Java technology that allows software developers to dynamically generate HTML, XML or other types of documents in response to a Web client request. This technology allows Java code and certain pre-defined actions to be embedded into static content. For example, the JSP syntax adds additional XML—like tags, called JSP actions, to be used to invoke built-in functionality. Additionally, the technology allows for the creation of JSP tag libraries that act as extensions to the standard HTML or XML tags. Tag libraries provide a platform independent way of extending the capabilities of a Web server.

System Environment

Figure 1:
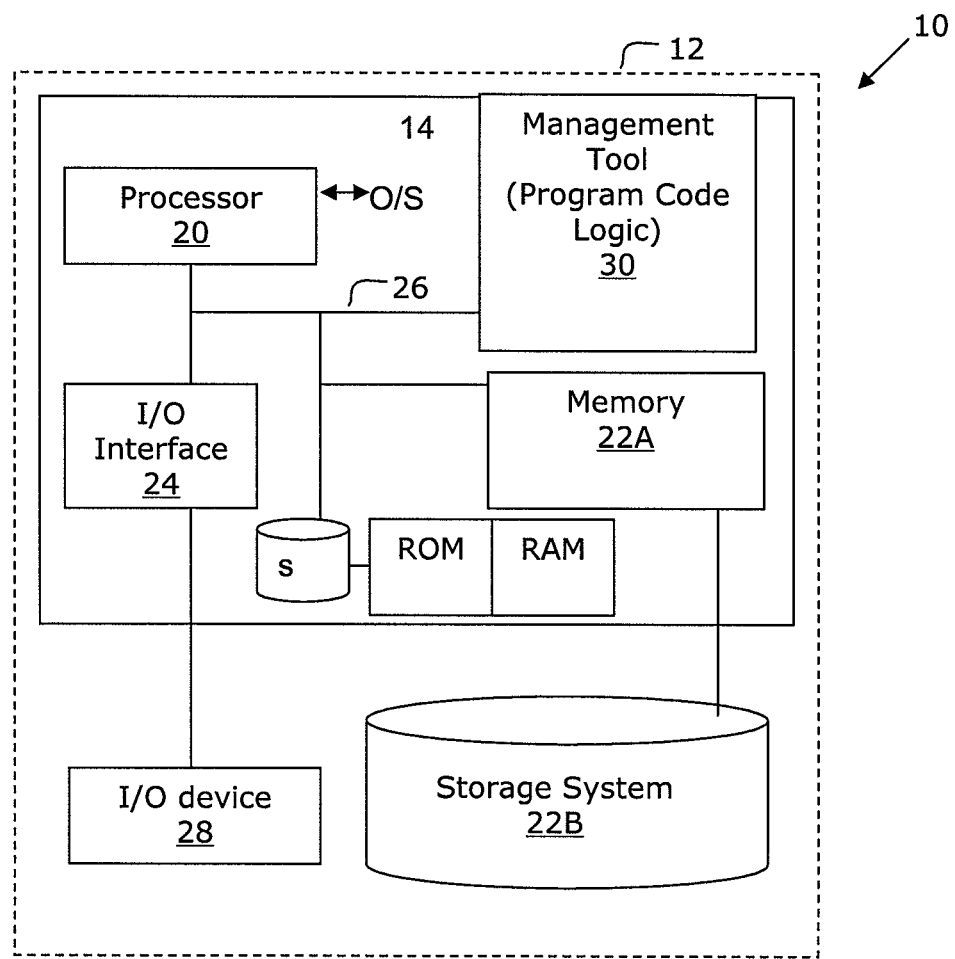
FIG. 1 shows an illustrative environment for implementing the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management tool 30, which includes Program Control Logic to make the computing device 14 operable to save pertinent portions of a web application for future retrieval in accordance with the invention, e.g., process described herein.

The computing device 14 includes a processor 20, a memory 22A, an input/output (I/O) interface 24, and a bus 26. The memory 22A can include local memory employed during actual execution of program code (Program Control Logic), bulk storage, and cache memories which provide temporary storage of at least some program code in order to reduce the number of times code must be retrieved from bulk storage during execution. Further, the computing device 14 is in communication with an external I/O device/resource 28 and a storage system 22B. The I/O device 28 can comprise any device that enables an individual to interact with the computing device 14 or any device that enables the computing device 14 to communicate with one or more other computing devices using any type of communications link. For example, the external I/O device/resource 28 may be keyboards, displays, pointing devices, etc. In accordance with the present invention, a programmer or designer can insert JSP tags (or other scripting technologies) in an HTTP document using the external I/O device/resource 28. The storage system 22B can be used to store the saved pertinent portions of the web application, in accordance with the invention.

In general, the processor 20 executes the Program Control Logic, which can be stored in memory 22A and/or storage system 22B or the management tool 30. While executing the Program Control Logic, the processor 20 can read and/or write data to/from memory 22A, storage system 22B, the management tool 30, and/or I/O interface 24. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code, as discussed in more detail below. In each embodiment, the Program Control Logic and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Exemplary Processes in Accordance with the Invention

Figure 2:
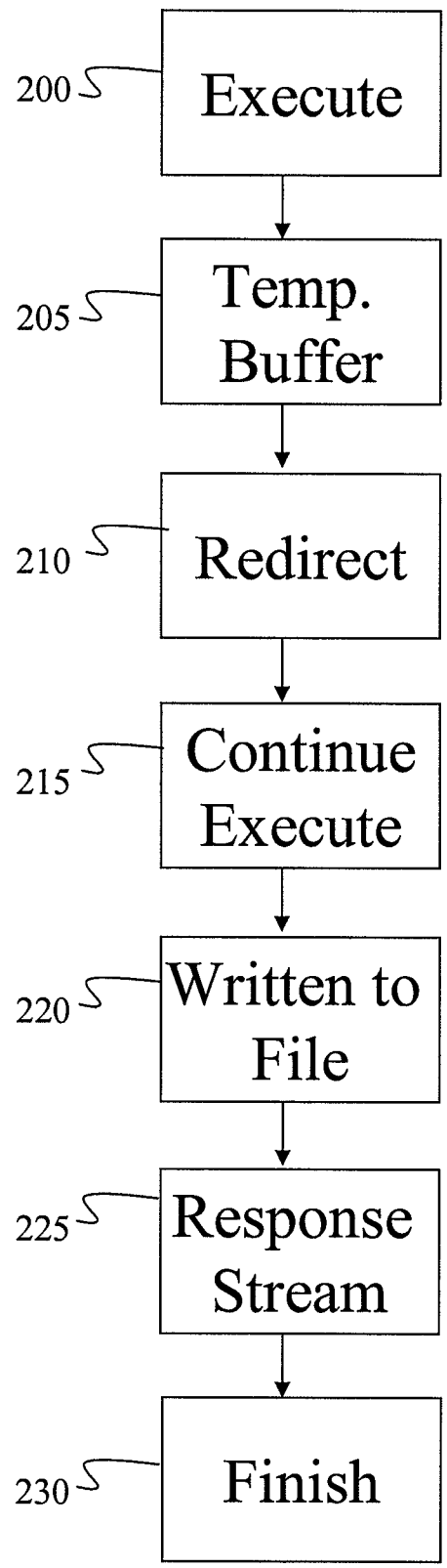
FIG. 2 shows a flow chart implementing processes in accordance with aspects of the invention.

FIG. 2 is a flow diagram showing processing steps of embodiments of the invention. FIG. 2 may equally represent a high-level block diagram of components of the invention implementing the steps thereof. The steps of FIG. 2 may be implemented on computer program code in combination with the appropriate hardware. This computer program code (Program Control Logic) may be stored on storage media such as a diskette, hard disk, CD-ROM, DVD-ROM or tape, as well as a memory storage device or collection of memory storage devices such as read-only memory (ROM) or random access memory (RAM) shown in FIG. 1. Additionally, the computer program code can be transferred to a workstation over the Internet or some other type of network.

The invention can take the form of hardware and software elements as shown in FIG. 1, e.g., computer infrastructure. The software elements may be firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

In embodiments, a service provider, such as a Solution Integrator, could offer to perform the processes described herein. In this case, the service provider can create, maintain, deploy, support, etc., the computer infrastructure that performs the process steps of the invention for one or more customers. In return, the service provider can receive payment from the customer(s) under a subscription and/or fee agreement.

Referring to FIG. 2, at step 200, JSP (or other scripting technology) is executed by the system of the invention. By way of example, using the code snippet as shown above, the execution of the JSP will begin at "<% @ taglib prefix="util" uri="http://www.company name.com/tags" %>", an execution tag in the HTML document prior to the first scripting tag. In embodiments, the start tag has not yet been encountered and, as such, no text following the above snippet will be saved in a file. In this way, HTTP code may continue to be rendered and executed, but no text will be saved thus reducing the load placed on the computing system. In embodiments, JSP is executed via a JSP processor (e.g., a servlet engine).

Although JSP is used with reference to FIG. 2, this is not to be considered a limiting feature of the present invention. Instead, the use of JSP is one illustrative example and, as discussed herein, the present invention contemplates the use of other scripting technologies such ASP or PHP.

At step 205, a temporary buffer is created to hold the body of the JSP as it is being rendered. The temporary buffer may be provided in the memory or storage system of FIG. 1, for example. At step 210, the output (e.g., results of executing the JSP) is redirected to the buffer. That is, as the JSP is being executed, it is outputting data that is directed to the buffer. For example, the text between the start and end tag, e.g., "<util: save filename="receipt.html"> and "</util:save>" will be redirected and saved to the buffer. In embodiments, the data will not be sent directly to the user.

At step 215, the system of the invention continues to execute the JSP. As should be understood by those of skill in the art, although an end tag may have been encountered, additional JSP may still be rendered and executed by the system of the invention. The additional data, after the end tag, though, will not be saved. In this manner, only pertinent portions of the text (data) will be saved to the file, which effectively reduces the overall amount of data that needs to be saved to a file. At step 220, the buffered data will be written to a file. In embodiments, the start tag will have an attribute, which is used to name the file. At step 225, the buffered data is also written to the response stream. As should be understood by those of skill in the art, the response stream is the data sent to the user, such as a confirmation. At step 230, the system finishes executing the JSP.

In view of the above, when displaying a confirmation page to a customer, it is now possible to save exactly what was shown to the customer. This will allow a service provider or merchant, for example, to easily retrieve such information in case the customer attempts to dispute a charge. The pertinent portions, e.g., information, could also be used to debug problems with web applications where a user is displayed one value but another value is saved in the database.

While the invention has been described in terms of embodiments, those skilled in the art will recognize that the invention can be practiced with modifications and in the spirit and scope of the appended claims.

What is claimed is:

1. A method for saving only a pertinent portion of a dynamically generated web page, comprising:
    placing a start tag at a first location in an HTML document;
    placing an end tag in a second location in the HTML document; and
    placing an execution tag into the HTML document prior to the start tag,
    wherein:
        execution of a script is begun at the execution tag, without saving text rendered between the execution tag and the start tag,
        text between the start tag and the end tag is rendered and output to a temporary buffer,
        the script continues executing after encountering the end tag, without saving text rendered after the end tag,
        the text between the start tag and the end tag is written to a file from the temporary buffer such that the file comprises the pertinent portion of the dynamically generated web page including a confirmation of a transaction,
        the start tag includes an attribute to name the file,
        a response stream sent to an end user comprises data generated by the execution of the script, the data comprises the text rendered between the execution tag and the start tag, the text rendered after the end tag, and the text between the start tag and the end tag, and
        the text between the start tag and the end tag is written to the response stream from the temporary buffer such that the text between the start tag and the end tag is rendered to the end user from the temporary buffer and does not come directly from the execution of the script.

2. The method of claim 1, wherein the start tag and the end tag are server scripting technology tags.

3. The method of claim 1, wherein the start tag and the end tag are written directly into a web application at a beginning and an end of the text to be saved.

4. The method of claim 1, wherein the steps of claim 1 are provided on a computing infrastructure.

5. The method of claim 4, wherein the computing infrastructure is maintained, deployed, serviced and configured by a service provider.

6. A method for archiving pertinent portions of a web application comprising:
    providing a computer infrastructure being operable to:
        render a web page for displaying to a user, wherein the web page comprises an HTML document comprising a pertinent portion including a confirmation of a transaction; and
        save only the pertinent portion without saving the entire HTML document,
    wherein the rendering and the saving comprise:
        executing a script;
        creating a temporary buffer;
        outputting results of the script between a start tag and an end tag to the temporary buffer;

writing the results from the temporary buffer to a file and into a response stream, wherein the response stream comprises data generated by the execution of the script, the data comprises additional text rendered prior to the start tag and after the end tag, and the results of the script between the start tag and the end tag, and the results of the script between the start tag and the end tag are written to the response stream from the temporary buffer such that the results are rendered to the user from the temporary buffer and do not come directly from the execution of the script; and sending the response stream to the user; and wherein the script includes the start tag with an attribute to name the file.

7. The method of claim 6, wherein the script is a server scripting technology.

8. The method of claim 6, wherein the additional text outside of the start tag and the end tag is not saved into the file.

9. The method of claim 6, wherein the temporary buffer is provided in a memory or storage system.

10. The method of claim 9, wherein the temporary buffer is created to hold a body of server scripting pages being rendered.

11. The method of claim 6, wherein the computer infrastructure is maintained, deployed, serviced and configured by a service provider.

12. The method of claim 6, wherein the method of claim 6 is provided by a service provider for a fee.

13. A computer program product for archiving pertinent portions of a web application, the computer program product comprising:

a computer readable memory, the computer readable memory being an apparatus that stores program code;

first program instructions to execute a script in an HTML document beginning at an execution tag;

second program instructions to create a temporary buffer; and third program instructions to output results of the script rendered between a start tag and an end tag to the temporary buffer and write the results from the temporary buffer to a file and into a response stream, without saving additional text rendered prior to the start tag and after the end tag, wherein:

the response stream comprises data generated by the execution of the script, the data comprises the additional text rendered prior to the start tag and after the end tag, and the results of the script rendered between the start tag and the end tag, the start tag includes an attribute to name the file and the results are written to the response stream from the temporary buffer such that the results rendered to an end user from the temporary buffer and do not come directly from the execution of the script, the start tag includes an attribute to name the file, wherein the first, second and third program instructions are stored on the computer readable media, and the results are a pertinent portion of a web page for displaying to the end user, the pertinent portion including a confirmation of a transaction.

14. The computer program product of claim 13, wherein the computer program product is provided by a service provider for a fee.

15. The method of claim 1, wherein only the pertinent portion is saved in the file without saving the entire dynamically generated web page.

16. The method of claim 6, wherein the rendering comprises:

rendering the additional text prior to the start tag without saving the additional text prior to the start tag; and rendering the additional text after the end tag without saving the additional data after the end tag.

17. The method of claim 6, wherein:

the response stream is a response to the transaction between a merchant and a consumer;

the results of the script between the start tag and the end tag comprise the pertinent portion which includes price information for the transaction; and the pertinent portion is accessed by the merchant from the file without the merchant having to access the additional text rendered prior to the start tag and after the end tag.

* * * * *